G. & W. L. NIXON.

Nose Ring.

No. 74,582.

Patented Feb. 18, 1868.

Witnesses
Ruth R. Abbott
S. Odney

Inventors
George Nixon
Wm L Nixon
By Jo Abbott
Attorney

United States Patent Office.

GEORGE NIXON AND WILLIAM L. NIXON, OF SANDYVILLE, OHIO.

Letters Patent No. 74,582, dated February 18, 1868.

IMPROVEMENT IN DEVICE TO PREVENT HOGS FROM ROOTING.

The Schedule referred to in these Letters Patent and making part of the same.

TO ALL WHOM IT MAY CONCERN:

Be it known that we, GEORGE NIXON and WILLIAM L. NIXON, of Sandyville, in the county of Tuscarawas, and State of Ohio, have invented a new and useful Device to Prevent Hogs from Rooting; and we do hereby declare that the following is a full, clear, and exact description of our invention, reference being had to the accompanying drawings, and to the letters of reference marked thereon, of which drawings—

Figures 4, 6:
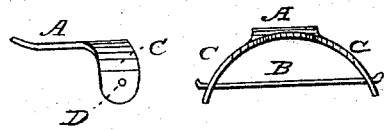
Figure 5:
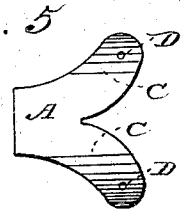

Figures 4, 5, and 6 are side view, plan, and end view of our device, and

Figure 7:
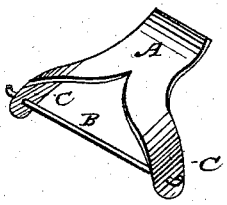

Figure 7 is a perspective view of our device as it appears when on the hog's nose.

The nature of our invention consists in the application of a peculiarly-shaped device to a hog's nose, in such a manner as that, while it does not injure the hog in the least, nor interfere at all with his eating and drinking, it will effectually prevent him from rooting, and is so attached as to render it impossible for the hog to get it off his nose.

To enable others skilled in the art to make and use our invention, we will proceed to describe its construction and application.

Figure 3:
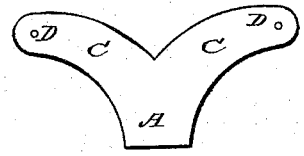
Figure 3 shows the form of the metal blank for making our device.

A piece of sheet iron, brass, or other suitable material, is cut out in the form shown in fig. 3, and the holes D D are punched or drilled in the arms C C. This piece, A, is then bent into the form shown in figs. 4, 5, 6, and 7, and a wire, B, is put through the holes D D, when the device is complete.

Figure 1:
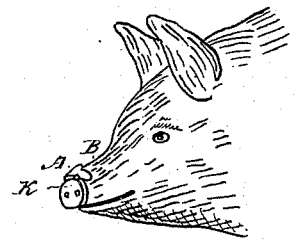
Figure 1 is a perspective view of our device as it appears on the hog's nose.
Figure 2:
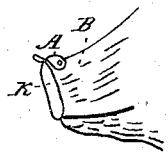
Figure 2 is a side view of the same.

To apply this device, a hole is made with an awl under the skin of the hog's nose, just back of the snout K. The wire, B, is then taken out of the holes D D, the device A is set on the nose, and the wire, B, is passed through one hole, D, and then through the hole made by the awl, then through the other hole, D, and the wire, B, is then bent up to prevent its coming out. By this operation the device is secured in the position shown in figs. 1 and 2. When once on, the wire, B, soon heals in, as it has no motion of any kind, but merely serves as an axis of rotation for the device A, and the hog has no difficulty whatever in eating or drinking, but is effectually prevented from rooting.

What we claim as our invention, and desire to secure by Letters Patent, is—

The within-described device, consisting of the plate A, arms C C, with holes D D, and wire, B, the several parts being arranged and used substantially in the manner and for the purpose herein specified.

As evidence that we claim the foregoing, we have hereunto set our hands in the presence of two witnesses.

GEORGE NIXON,
WILLIAM L. NIXON.

Witnesses:
JOHN EAKIN,
NATHANIEL RUSSELL.